:::
United States Patent Office 3,176,031
Patented Mar. 30, 1965

3,176,031
Δ⁵⁽¹⁰⁾-ESTRENE-9α,17β-DIOL-3-ONE AND ITS 17-CARBOXYLIC ACID ESTERS
Gerard Nomine, Noisy-le-Sec, Seine, and Robert Bucourt, Clichy sous Bois, and Jean Tessier, Paris, France, assignors to Roussel-UCLAF, S.A., Paris, France, a corporation of France
No Drawing. Filed Apr. 29, 1963, Ser. No. 276,164
Claims priority, application France, May 2, 1962, 896,172
8 Claims. (Cl. 260—397.45)

The invention relates to the novel product Δ⁵⁽¹⁰⁾-estrene-9α,17β-diol-3-one and its esters having the formula

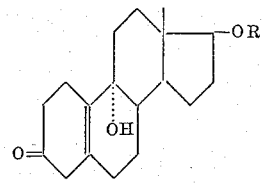

wherein R is selected from the group consisting of hydrogen and an acyl radical of an organic carboxylic acid having 1 to 18 carbon atoms and to a novel process for preparing the said products.

It is an object of the invention to provide the novel product, Δ⁵⁽¹⁰⁾-estrene-9α,17β-diol-3-one and its 17-carboxylic acid esters.

It is another object of the invention to provide a novel process for the preparation of Δ⁵⁽¹⁰⁾-estrene-9α,17β-diol-3-one and its 17-carboxylic acid esters.

These and other objects and advantages of the invention will become obvious from the following detailed description.

The novel products of the invention are Δ⁵⁽¹⁰⁾-estrene-9α,17β-diol-3-one and its esters having the formula

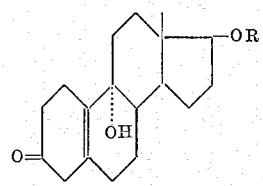

wherein R is selected from the group consisting of hydrogen and an acyl radical of an organic carboxylic acid having 1 to 18 carbon atoms.

The acyl radical of the organic carboxylic acid having 1 to 18 carbon atoms may be derived from an aliphatic aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids, such as undecylenic acid and oleic acid, cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid, arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

The novel products of the invention are useful intermediates for the preparation of other steroids. For example, Δ⁵⁽¹⁰⁾-estrene-9α,17β-diol-3-one and its 17-carboxylic acid esters can be dehydrated by heating or by acid treatment to form Δ⁴,⁹-estradiene-17β-ol-3-one and its 17-carboxylic acid esters which are known to have anabolic activity without androgenic activity.

The novel process of the invention for the preparation of Δ⁵⁽¹⁰⁾-estrene-9α,17β-diol-3-one and its 17-carboxylic acid esters comprises subjecting 9α,10α,epoxy-Δ⁴-estrene-17β-ol-3-one or its 17-carboxylic acid esters to catalytic hydrogenation in the presence of a catalyst selected from the group consisting of platinum and palladium in a neutral or alkaline medium to form Δ⁵⁽¹⁰⁾-estrene-9α,17β-diol-3-one or its 17-carboxylic acid esters.

If alkaline conditions are employed for the catalytic hydrogenation, the platinum or palladium is preferably on an alkaline earth metal carbonate support. Examples of suitable carbonates are strontium carbonate, barium carbonate and calcium carbonate. Palladium is the preferred metal.

A tertiary base is the preferred solvent when the catalytic hydrogenation is conducted under alkaline conditions. Examples of suitable tertiary bases are pyridine, N-lower alkyl pyridines, such as collidine, picolines, such as α,γ-lutidine, N-lower alkyl morpholines, such as N-methyl morpholine and N-ethyl morpholine, N-lower alkyl piperidines, such as N-methyl piperidine, N-ethyl piperidine and N-amyl piperidine and tertiary amines, such as trimethylamine, triethylamine, dimethylaniline, diethylaniline, etc.

When the catalytic hydrogenation is effected under neutral conditions, the solvent is preferably ethanol or ethyl acetate and the catalyst is preferably palladium on an activated carbon support.

The 17-carboxylic acid esters of 9α,10α-epoxy-Δ⁴-estrene-17β-ol-3-one used as starting materials can be prepared according to the process described in U.S. Patent No. 3,055,885 and 9α,10α-epoxy-Δ⁴-estrene-17β-ol-3-one can be prepared by the process described in the commonly assigned, copending U.S. application Serial No. 272,204, filed on April 11, 1963. The said process comprises reducing 9α,10α-epoxy-17β-acyloxy-Δ⁴-estrene-3-one to form 9α,10α-epoxy-17β-acyloxy-Δ⁴-estrene-3-ol, saponifying the latter under alkaline conditions to form 9α,10α-epoxy-Δ⁴-estrene-3,17β-diol and oxidizing the latter to 9α,10α-epoxy-Δ⁴-estrene-17β-ol-3-one.

In the following examples there are described several preferred embodiments to illustrate the invention. However, it should be understood that the invention is not intended to be limited to the specific embodiments.

EXAMPLE I

*Preparation of 17β-benzoyloxy-Δ⁵⁽¹⁰⁾-estrene-9α-ol-3-one*

Step A.—Preparation of the catalyst: Palladium hydroxide was precipitated starting from an aqueous solution containing 20% of palladium chloride on strontium carbonate by bringing the pH of the solution to 7 by the addition of N sodium hydroxide solution. The precipitated catalyst was vacuum filtered, washed with water, and dried. A product containing about 10% of palladium hydroxide was obtained. 362 mg. of this product were introduced into 75 cc. of pyridine and subjected to hydrogenation for a period of 2 hours whereby about 70 cc. of gas were absorbed.

Step B.—*Reduction of 17β-benzoyloxy-9α,10α-epoxy-Δ⁴-estrene-3-one:* 3 gm. of the 17β-benzoyloxy-9α,10α- eqoxy-Δ⁴-estrene-3-one, prepared according to U.S. Patent No. 3,055,885, were introduced into the pyridinic suspension of the hydrogenated catalyst of Step A. The reaction mixture was subjected to hydrogenation for a period of 4 hours during which the volume of gas absorbed was about 170 cc. The hydrogenated solution was filtered and the filtrate was evaporated to dryness under vacuum. The raw product obtained was subjected to chromatography through magnesium silicate and eluted with methylene chloride containing 1 part per thousand of pyridine. The eluate furnished, after evaporation to dryness, 2.4 gm. of 17β-benzoyloxy-Δ⁵⁽¹⁰⁾-estrene-9α-ol-3-one. After recrystallization from methanol containing 1 part per thousand of pyridine the product had a melting point of 207° C. and a specific rotation $[\alpha]_D^{20} = +219°$ (c.=0.5% in pyridine).

The product occurred in the form of white platelets and was soluble in chloroform, hot methanol, containing 0.1 part per thousand of pyridine, hot ethanol, hot acetone, and hot benzene, very slightly soluble in ether and insoluble in water.

Analysis for $C_{25}H_{30}O_4$, molecular weight=394.49: Calculated C, 76.1%; H, 7.6%. Found C, 75.9%; H, 7.6%.

This compound is not described in the literature.

In an analogous manner, Δ⁵⁽¹⁰⁾-estrene-9α,17β-diol-3-one was obtained by hydrogenating 9α,10α-epoxy-Δ⁴-estrene-17β-ol-3-one.

*Step C.—Dehydration of 17β-benzoyloxy-Δ⁵⁽¹⁰⁾-estrene-9α-ol-3-one:* 0.200 gm. of 17β-benzoyloxy-Δ⁵⁽¹⁰⁾-estrene-9α-ol-3-one were dissolved in 2 cc. of pyridine. 10 cc. of ethyl acetate were added thereto and the mixture was heated to boiling under reflux for a period of one hour. The solvent was evaporated under vacuum and the residue was redissolved in 5 cc. of ethanol and heated again to reflux for a period of one hour. The solvent was again evaporated under vacuum. The residue was triturated with methanol and solidified into a crystalline product to provide 0.164 gm. of 17β-benzoyloxy-Δ⁴,⁹-estradiene-3-one.

EXAMPLE II

*Preparation of 17β-benzoyloxy-Δ⁵⁽¹⁰⁾-estrene-9α-ol-3-one*

17β - benzoyloxy - 9α,10α - epoxy-Δ⁴-estrene-3-one was catalytically hydrogenated in a 95% ethanol solution in the presence of palladized carbon black to form 17β-benzoyloxy - Δ⁵⁽¹⁰⁾ - estrene-9α-ol-3-one. Similar results were obtained by using ethyl acetate as the solvent rather than 95% ethanol.

In an analogous manner, 9α,10α-epoxy-Δ⁴-estrene-17β-ol-3-one was catalytically hydrogenated to form Δ⁵⁽¹⁰⁾-estrene-9α-ol-3-one.

Various modifications of the process of the invention may be made without departing from the spirit or scope thereof and it is to be understood that the invention is to be limited only as defined in the appended claims.

We claim:

1. An estrene compound having the formula

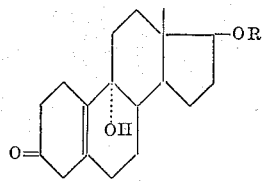

wherein R is selected from the group consisting of hydrogen and an acyl radical of an organic carboxylic acid having 1 to 18 carbon atoms.

2. 17β-benzoyloxy-Δ⁵⁽¹⁰⁾-estrene-9α-ol-3-one.

3. A process for the preparation of a Δ⁵⁽¹⁰⁾-estrene compound having the formula

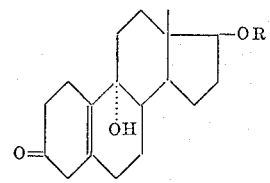

wherein R is selected from the group consisting of hydrogen and an acyl radical of an organic carboxylic acid having 1 to 18 carbon atoms which comprises catalytically hydrogenating a compound having the formula

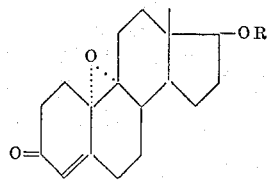

wherein R has the above definition in the presence of a metal catalyst selected from the group consisting of paladium and platinum to form the said Δ⁵⁽¹⁰⁾-estrene.

4. The process of claim 3 wherein the hydrogenation is effected in the presence of palladium on an inert support.

5. The process of claim 3 wherein the hydrogenation is effected in a tertiary base.

6. The process of claim 3 wherein the hydrogenation is effected in pyridine.

7. The process of claim 3 wherein the hydrogenation is effected under neutral conditions in a solvent selected from the group consisting of ethanol and ethyl acetate.

8. A process for the preparation of a Δ⁵⁽¹⁰⁾-estrene compound having the formula

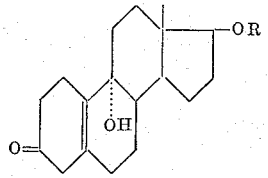

wherein R is selected from the group consisting of hydrogen and an acyl radical of an organic carboxylic acid having 1 to 18 carbon atoms which comprises catalytically hydrogenating a compound having the formula

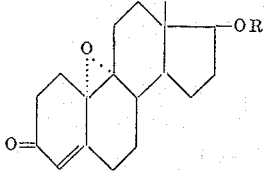

wherein R has the above definition in pyridine in the presence of palladium on an alkaline earth metal carbonate support to form the said Δ⁵⁽¹⁰⁾-estrene and recovering the latter.

References Cited by the Examiner

UNITED STATES PATENTS

| | | | |
|---|---|---|---|
| 2,846,452 | 8/58 | Campbell et al. | 260—397.4 |
| 2,991,230 | 7/61 | Kita | 195—51 |
| 3,040,065 | 6/62 | Schneider et al. | 260—397.3 |
| 3,055,885 | 9/62 | Nomine et al. | 260—239.5 |

LEWIS GOTTS, *Primary Examiner.*